US012754989B1

(12) United States Patent
Lyle et al.

(10) Patent No.: US 12,754,989 B1
(45) Date of Patent: Oct. 6, 2026

(54) SECONDARY DEVICE REMOTE SIGNALING-BASED VIDEO AUTHENTICATION METHOD AND SYSTEM

(71) Applicant: UIPCO, LLC, San Antonio, TX (US)

(72) Inventors: Ruthie D. Lyle, Durham, NC (US); Snehal Desai, Richardson, TX (US); David Joaquin Harris, San Antonio, TX (US); Eric David Schroeder, San Antonio, TX (US); Jeffrey David Calusinski, San Antonio, TX (US)

(73) Assignee: United States Automobile Association (USAA), San Antonio, TX (US)

( * ) Notice: Subject to any disclaimer, the term of this patent is extended or adjusted under 35 U.S.C. 154(b) by 52 days.

(21) Appl. No.: 19/039,931

(22) Filed: Jan. 29, 2025

Related U.S. Application Data

(63) Continuation of application No. 17/823,551, filed on Aug. 31, 2022, now Pat. No. 12,271,462.

(60) Provisional application No. 63/239,074, filed on Aug. 31, 2021.

(51) Int. Cl.
*G06F 21/36* (2013.01)
*G06F 21/30* (2013.01)
*G06F 21/32* (2013.01)
*H04L 9/40* (2022.01)

(52) U.S. Cl.
CPC ............ *G06F 21/36* (2013.01); *G06F 21/305* (2013.01); *G06F 21/32* (2013.01); *H04L 63/0853* (2013.01); *H04L 63/102* (2013.01); *H04L 63/105* (2013.01)

(58) Field of Classification Search
CPC ........ G06F 21/36; G06F 21/305; G06F 21/32; H04L 63/0853; H04L 63/102; H04L 63/105
See application file for complete search history.

(56) References Cited

U.S. PATENT DOCUMENTS

| | | | |
|---|---|---|---|
| 2016/0180150 | A1 | 6/2016 | Negi et al. |
| 2021/0127085 | A1 | 4/2021 | Greaves |
| 2022/0269761 | A1 | 8/2022 | Steelberg et al. |
| 2022/0399024 | A1 | 12/2022 | Siyavudeen et al. |

OTHER PUBLICATIONS

Office Action mailed Jul. 18, 2024 for U.S. Appl. No. 17/823,551.
Notice of Allowance mailed Dec. 9, 2025 for U.S. Appl. No. 17/823,551.

*Primary Examiner* — Abdulkader M Alriyashi
(74) *Attorney, Agent, or Firm* — Plumsea Law Group, LLC

(57) ABSTRACT

A remote signal-based method and system of performing an authentication of images of a person in order to permit access to a secured resource. The system and method are configured to cause a visual and/or haptic pattern response to occur in a secondary device while collecting image data from a different, primary device. The image data is evaluated to determine whether the appropriate pattern is present. If the pattern is present, the system determines the image is authentic and can verify an identity of the person, and can further be configured to automatically grant the person access to one or more services, features, or information for which he or she is authorized.

20 Claims, 7 Drawing Sheets

SECONDARY DEVICE REMOTE SIGNALING-BASED VIDEO AUTHENTICATION METHOD AND SYSTEM

CROSS-REFERENCE TO RELATED APPLICATIONS

This application is a continuation of and claims the benefit of U.S. patent application Ser. No. 17/823,551, filed on Aug. 31, 2022 and titled "Secondary Device Remote Signaling-Based Video Authentication Method and System", which application claims the benefit of U.S. Provisional Patent Application Ser. No. 63/239,074 filed on Aug. 31, 2021 and titled "Secondary Device Remote Signaling-Based Video Authentication Method and System", the disclosure of which applications are incorporated by reference in their entirety.

TECHNICAL FIELD

The present disclosure generally relates to identity authentication, and specifically to a method and system for authentication of videos of persons seeking access to one or more secured services, features, and resources. The authentication is based on generation of a visual or haptic signal via a first computing device and a synchronized capture of image data by a second computing device.

BACKGROUND

Organizations may provide authorized end-users with various secured services or resources via multiple communication channels. Examples of such channels include modes of communication (e.g., a communications network) for exchanging data between devices, where such devices may include, but are not limited to, computing devices, such as tablets, personal computers, and smartphones; point of sale devices; ATMs; connected smart devices, such as refrigerators, watches, and laptops; telephones, such as landline telephones or mobile phones; electronically locked spaces managed by computer user interfaces, such as safe deposit box chambers, lockers, cars, offices, homes; and face-to-face contacts, such as interaction between a user and an employee of the organization. Channels may also include software and firmware associated with the devices and communications devices, such as web portals, applications, networks, mobile applications, and instant messaging systems. Channels may also include hardware associated with the computing devices and telephones, such as the network hardware, credit card scanners, and retinal scanners.

In most scenarios in which an end-user attempts to access a secured resource via one or more of these channels, the end-user will be required to provide some proof of identity, typically associated with an identification card, key-card, fingerprint, or other factor before access is granted. Personal computers (computing devices) pose additional complexities in authenticating users. Computing devices are commonly used by more than one person. It is generally not safe to assume that the identity of the computing device satisfies the ownership factor. Additionally, computing devices have been more easily compromised than other devices. Current solutions increase security, but are often inconvenient for users. More recently, the threat of video forgery (e.g., deep fakes) have increased concern that image data of an end-user may not be authentic.

Thus, authentication (i.e., identifying and verifying) of an end-user can be time-consuming for both the end-user and the organization, as well as burdensome for users who are required to carry and present the necessary identification credentials and/or keys, or memorization of passwords or codes. It may be appreciated that many businesses and other organizations would benefit from mechanisms by which to reduce the costs associated with the authentication and authorization of customers. Furthermore, customers will be attracted by an authentication system that reduces or even eliminates the need to carry or remember multiple unique identification factors, as well as a system that significantly improves account security.

There is a need in the art for a system and method that addresses the shortcomings discussed above.

SUMMARY

In one aspect, a method of verifying an authenticity of images in order to protect user resources. The method includes a first step of receiving, at a cloud-based authentication system and from a first computing device, a request to access a secured resource of a first user. The method also includes a second step of transmitting, from the authentication system and in response to the request, a first control signal to a second computing device associated with the first user, the first control signal including a first pattern. A third step includes obtaining, at the authentication system, first image data captured by the first computing device when presentation or production of the first pattern via the second computing device was to have occurred, the first image data also including a face of a person. Furthermore, a fourth step includes determining that the first image data includes a representation of the first pattern. A fifth step includes determining, in response to the first image data including a representation of the first pattern, that the first image data is an authentic image of the first user, and in a sixth step, granting access to the secured resource via the first computing device.

In another aspect, a method for detecting fraudulent attempts to obtain access to secure user data using image data is disclosed. The method includes a first step of receiving, at a cloud-based authentication system and from a first computing device, a request to access a secured resource of a first user, a second step of transmitting, from the authentication system and in response to the request, a first control signal to a second computing device associated with the first user, the first control signal including a first pattern, a third step of obtaining, at the authentication system, first image data captured by the first computing device when presentation or production of the first pattern via the second computing device was to have occurred, the first image data also including a face of a person, a fourth step of determining that the first image data fails to include a representation of the first pattern, a fifth step of determining, in response to the first image data failing to include a representation of the first pattern, that there is a high likelihood of the request originating from a fraudulent source, and a sixth step of denying the request and blocking access to the secured resource.

In another aspect, a system for verifying an authenticity of images in order to protect user resources includes a processor and machine-readable media. The machine-readable media include instructions which, when executed by the processor, cause the processor to receive, at a cloud-based authentication system and from a first computing device, a request to access a secured resource of a first user, and transmit, from the authentication system and in response to the request, a first control signal to a second computing device associated with the first user, the first control signal including a first pattern. The instructions further cause the process to obtain, at the authentication system, first image data captured by the first computing device when presentation or production of the first pattern via the second computing device was to have occurred, the first image data also including a face of a person, and determine that the first image data includes a representation of the first pattern. In addition, the instructions cause the processor to determine, in response to the first image data including a representation of the first pattern, that the first image data is an authentic image of the first user, and grant access to the secured resource via the first computing device.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
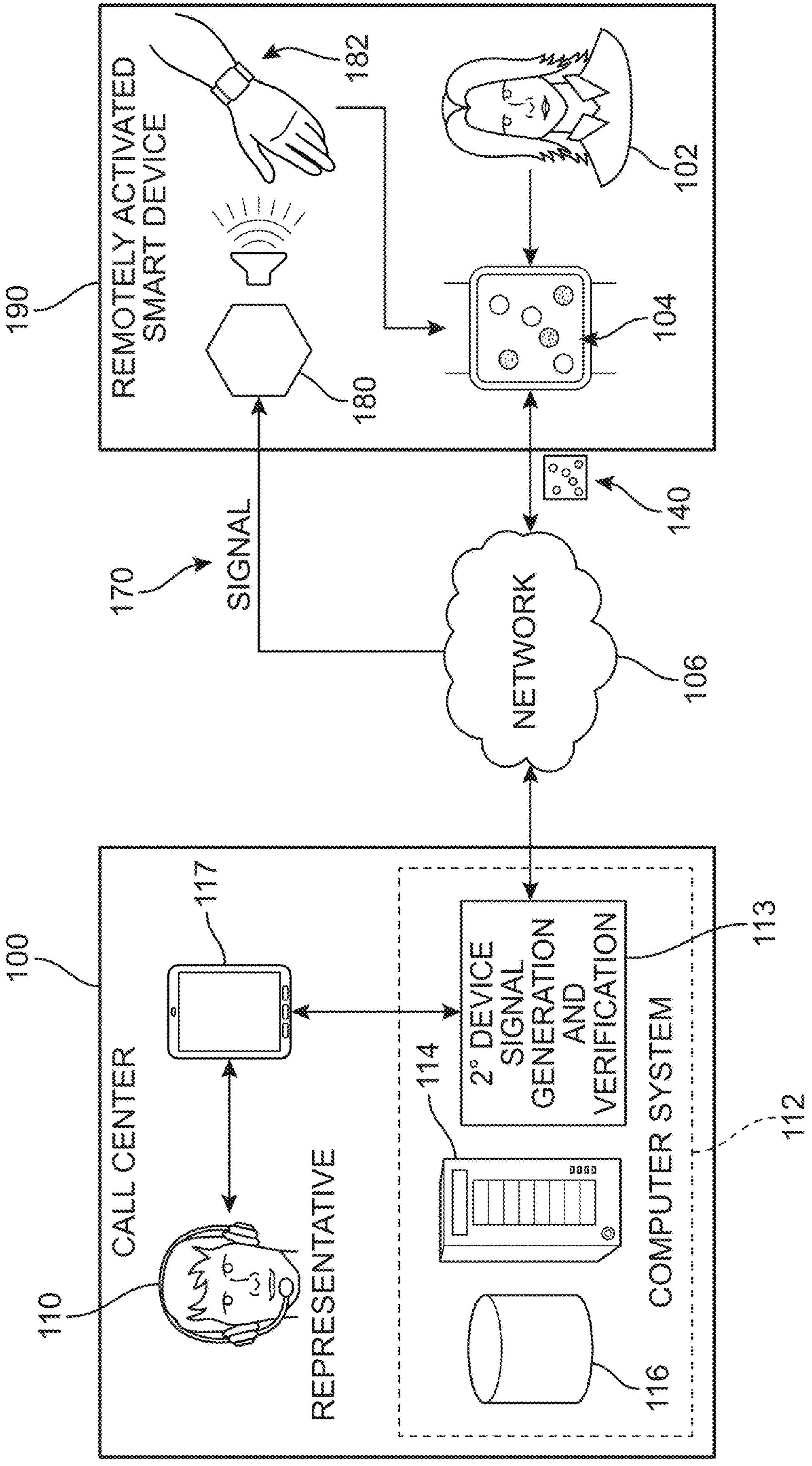
FIG. 1 is an overview of a scenario in which a person provides image data during a remote signaling event in order to obtain access to a secured resource, according to an embodiment.

The embodiments provide a method and system of authenticating user videos and other streaming image data in a more secure and more efficient manner using remote signaling of user devices. As described in greater detail below, an authentication process and system based on remotely triggered visual or haptic signals on a known user device may be utilized for reducing and in some cases eliminating the need for users to present credentials, input passwords, or otherwise offer identity tokens or factors, as well as curtail the use of video forgery to fraudulently access secured resources such as a user's private account. The proposed system takes advantage of an increasing reliance on teleconferencing and the growing availability of image sensors with computing devices in the day-to-day life of the modern consumer. More specifically, the system contemplates the use of a remote signal to cause a user computing device ("secondary device") to display a visual indicator or vibrate while image data is recorded via a primary device. This can occur, for example, during a video session with a customer representative. In some cases, the representative may manually initiate the transmission of the control signal. In other cases, the system could be configured to monitor the position and orientation of the secondary device in the video feed. When the secondary device is in an appropriate position and orientation, the system could send a signal to have the device flash, display information, or produce a vibration and this output could be automatically detected within the video.

In different embodiments, such an approach can be advantageous in combating the growing threat of video forgery. Deep fake algorithms in particular are becoming increasingly sophisticated. By generating a face through a deep learning neural network, such algorithms are able to replace a real face with an imposter fake face in real time. Such algorithms can be implemented using both Artificial Intelligence (AI) and Machine Learning (ML) to 'trick' a secured system into releasing confidential information. While existing technologies allow digital watermarks to be added to images, videos, and audio files or streams to ensure the authenticity of distributed media, the use of such technologies is typically controlled by producers of the media rather than by a speaker within a video. As will be discussed below, the proposed systems can further be configured to verify a user's identity with minimal user effort and offer a simplified, efficient, and ultimately highly convenient process by which to authorize and grant the user access to secured resources. Such systems can rely on device infrastructure that is already in place for video and image recording, making it simple to deploy at a low cost.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. In addition, the term authentication refers to the process of proving (or verifying) an identity or source of identity, and typically occurs when subjects provide appropriate credentials to prove their identity. For example, when a user provides the correct password with a username, the password proves that the user is the owner of the username. Thus, the authentication provides proof of a claimed identity. In the embodiments described herein, authentication of an image based on the detection of a specific output in the image can be used to prove the user is the owner of the username. As a general matter, three main methods of authentication include (a) user knowledge, such as a password or PIN; (b) user possession, typically provided by the secured system, such as a key, smart card, CAC (Common Access Card), PIV card (Personal Identity Verification card), RSA, or other card or token, magnetic stripe cards, certificates with a digital signature, computing device that is configured to receive a control signal, etc.; and (c) biometric factors, such as voice recognition, facial recognition, retinal and fingerprint scans, etc.

Authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access. The term "passive" refers to the concept of a system and method that is not dependent on any particular 'active' interaction of a person with a device resulting from a change in the person's normal activity or behavior and/or do not require the user to remember anything. In other words, walking and moving their body (e.g., adjusting the position of their arm) from one location to another are passive interactions, as the person would perform these activities regardless of the authentication system that is in place. However, other user actions, such as but not limited to providing a passcode, security question answers, etc. are active inputs and a system requiring any of these types of information would not be considered passive. In addition, this type of arrangement-relying on wearable secondary devices-precludes the need to previously record and store any biometric data (e.g., retinal scan, fingerprint scan, voice-print, etc.) for the user, which some users are uncomfortable doing.

Organizations and businesses often provide support to customers by making available to their customers one or more member service representatives (MSRs) or other customer representatives and service agents (referred to generally herein as "agents") who have access to networked computers, telephones, often networked to a larger corporate computer network, including mainframes, microcomputers and LANs. For example, voice and data pathways into the center can be linked through routing servers and computer telephony integration (CTI). In some cases, CTI also facilitates interfaces with customer support servers in addition to any e-mail system, databases and web-based services. A customer may contact or be contacted by an MSR to learn more about a service or product, obtain guidance, or purchase various items. Implementations of the proposed systems and methods may also include interactions with an agent, virtual or human, of a secured system. This service representative or agent is stationed at a location that is remote relative to the customer's location, such as a call center. As used herein, the term "customer" or "user" should be understood to refer to any end-user or person requesting or receiving assistance or other communications from a secured system, including via a communication session with a remote agent, whether human or virtual/artificial. The customer can typically view at least one aspect of the interaction through a display of their computing device.

For purposes of introduction, an overview of one embodiment of the proposed systems and methods is illustrated with reference to FIG. 1. In FIG. 1, an example of an authentication process is shown in which a first user 102, in a first location 190, is on a call with a representative 110 who is at a call center 100, or otherwise in a remote location relative to the first user 102. The first user 102 is conversing with representative 110 in order to be authenticated and then obtain access to their account or other secured resource. In different embodiments, first user 102 can participate in the communication session via a telephone or a computing device configured with a network connection and connected to a camera or other image sensor, depending on the mechanism utilized for data transmission.

In some embodiments, first user 102 may have access to a secondary user computing device ("secondary device") 182. In one embodiment, secondary device 182 is a mobile device, for example, a smartwatch, or other wearable or portable smart computing device that can receive signals over a network including but not limited to smart glasses, smart jewelry, smart medical devices, smart apparel, and other smart wearable accessories. In addition, though not shown in FIG. 1, the user requesting access can make use of a primary computing device ("primary device") through which the communication session occurs. The primary device can include a tablet, a laptop, a smartphone, a desktop computer, or similar kind of device that allows user 102 to contact call center 100. For example, the first user 102 can be speaking and listening to the representative 110 via a desktop computer. For purposes of this example, the first customer 102 has just been connected to representative 110 and is seeking access to their account details.

In different embodiments, the secondary device 182 and/or primary device can include an electronics unit comprising a plurality of different components, such as one or more of various user interface components (e.g., a touchscreen display, keyboard, mouse, microphone, camera, speaker, etc.), a user interface module, a processor, and/or a communication module. These devices may include a system including one or more processors and memory. Memory may comprise a non-transitory computer readable medium. Instructions stored within memory may be executed by the one or more processors. The secondary device 182 and/or primary device may be configured to receive and analyze data from various input sensors associated the device or data that is communicated from external components or devices to the device. In some cases, the secondary device 182 and/or primary device may also include a navigation system equipped with a GPS receiver that can receive GPS information or other receivers capable of receiving global or local positioning information.

A communication module may allow the secondary device 182 and/or primary device to communicate wirelessly. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In different embodiments, the secondary device 182 and/or primary device may include a device display ("display") that can, for example, present information and various media for a product/service support software application ("app"). In other embodiments, as discussed below, the secondary device 182 can include a haptic output component configured to cause the secondary device 182 to vibrate or otherwise change pose. In some embodiments, the app is associated with the provider of the product/service for which the service representative is offering support. In some embodiments, the first user 102 can receive and send information through a user interface that may be presented on a display for the primary device. In some embodiments, the display may be a touchscreen, allowing the customer to interact with the user interface directly by touch. The user interface may refer to an operating system user interface or the interface of one or more software applications that may run on the either or both of the primary device and secondary device 182. In some embodiments, the user interface can include a messaging window or other chat-space by which the service representative may send messages or other digital content. Alternatively, in some embodiments, the first user 102 can also speak with the service representative via a voice calling application on primary device, or directly through a telephone or other external device.

In an example embodiment, customer service call center 100 includes at least one computer system 112. The term “computer system” refers to the computing resources of a single computer, the partial computing resources of a single computer, a plurality of computers communicating with one another, or a network of remote servers. In one embodiment, computer system 112 includes at least one server having at least one processor.

In the embodiment of FIG. 1, computer system 112 includes one or more computing devices 114 (for example, a server) that may be in communication with one or more databases 116. Databases 116 could be co-located with computing devices 114 or could be remote databases that are accessible by computing devices 114 over a network. Databases 116 can include any kind of storage devices, including but not limited magnetic, optical, magneto-optical, and/or memory, including volatile memory and non-volatile memory. In an example embodiment, computer system 112 may also include or be configured with access to an access management platform (see FIG. 2), of which a secondary device control signal generation and verification module (“control signal module”) 113 is a component. In some embodiments, control signal module 113 may be implemented in software, hardware, or a combination thereof.

In different embodiments, while the first user 102 is communicating with representative 110, the access management system can be configured to verify an identify of a person so as to either permit or deny access to the user-identity dependent services. As used herein, the term “user” or “member” or “account holder” should be understood to refer to any end-user or person requesting or receiving assistance or other communications from a support agent or service representative. It should be understood that while the following description presents a sequence illustrating the use of the proposed systems and methods in a customer-agent dynamic, in other embodiments, the proposed systems may be utilized by a broad range of end-users, including other types of work calls and corporate calls, or other instances in which access is dependent on video interaction or a detection of video forgery is needed.

In some embodiments, representative 110 may have access to a device of computer system 112. In one embodiment, representative 110 may have access to a representative device 117. In FIG. 1, representative device 117 is depicted as a mobile computing device, such as a smartphone or tablet computer. In other embodiments, representative device 117 could be a desktop computer, a laptop computer or any other kind of computing device. Using representative device 117, representative 110 may be able to review customer records, send documents and forms to a customer, provide access to a secured resource, and/or perform other tasks required to help a customer calling in to call center 100.

In some embodiments, both representative device 117 and secondary device 182 may be computer systems for processing and communicating information. Each device may generally include a processor, a data storage component, and a display. Each device may also include components to facilitate communication with external systems (for example, hardware and software components to enable communication over a network). In some cases, a device may include one or more input devices, such as a keyboard, mouse, and/or one or more physical buttons integrated into a case of the device. In other cases, a device may further include touchscreen controls and inputs.

In one embodiment, secondary device 182 could operate in a client-server relationship with one or more servers of computer system 112. For example, computer system 112 may include a server that communicates with secondary device 182, primary device, as well as other remote devices (e.g., user devices of other customers) over a network 106. The primary device and/or secondary device 182 may provide the front-end of a system that provides users with options for performing various kinds of tasks (for example, making fund transfers when the company is a bank). In some cases, primary device and/or secondary device 182 may run client software through a web browser, in which case the client software may be hosted on a server associated with computer system 112. In other cases, secondary device 182 and/or primary device may run client software in the form of a native software application that has been downloaded through a centralized marketplace (i.e., an “app store”). In some cases, while the client software that allows users to perform various tasks may be run on primary device or secondary device 182, the data may be retrieved from and stored on databases associated with computer system 112 (e.g., databases 116).

During the call between representative 110 and first user 102, the first user 130 requests access to an account or other secured resource of the first user. In response, in different embodiments, the remote access management system can automatically, or at the manual request of the service representative, initiate an authentication procedure, action, or task that includes a remote signaling event. As a general matter, a remote signaling event refers to the process and period during which the authentication system issues a control signal to a remote user device over a network, and the control signal causes the user device to visibly respond, either via a device display or a vibration motor.

In different embodiments, the access management system, through control signal module 113, can then generate one or more signals 170 that are transmitted over network 106. The signals 170 can, for example, include a specific visual signal, as well as a request to the secondary device 182 to display the visual signal at a specific time. The signals 170 are received by the secondary device 182 that is known to be associated with the first user (e.g., based on a previous device registration session) as a control signal 180 that causes the secondary device 182 to produce a particular output. In FIG. 1, in response to the signals 170, the secondary device 182 produces an image or sequence of images (“pattern”) on secondary display 104 that corresponds to a pattern of visual icons or other graphics rendered based on the data transmitted by the control signal module 113. Some non-limiting examples of such patterns include a sequence of flashes occurring within a few seconds, with the duration of each flash and time between flashes comprising the pattern, and/or a sequence of flashes of various colors, a specific graphic or animation, a number or other alphanumerical message, a sequence of images or indicia that are animated, etc. Similarly, haptic (vibration) patterns can include a sequence of vibrations occurring within a few seconds, with the duration of each vibration and time between vibrations comprising the pattern, and/or a sequence of changes in intensity of the vibrations, etc.

At or around the same time, in a different but synchronized or linked remote signaling event, the control signal module 113 also generates a control signal that requests or triggers a capture of a sample of image data 140 by a camera of (or connected to) the primary device. In some embodiments, the image data 140 is a segment taken from a video stream received during the communications session. This captured image data 140 can include an image of the secondary device 182 as well as the face of the user or other objects in the physical space (first location 190). A physical space can refer to any physical environment such as a room in an office, residence, or other building, as well as open or outdoor spaces. The captured image data 140 is received by the remote access management system via network 106.

Based on the received image data 140, the system will determine whether to authenticate the user for access to the secured resource. For example, the control signal module 113 can process and analyze image data 140 and determine whether the image data 140 includes a depiction or representation of the pattern that was sent to the secondary device 182. If the expected pattern is detected in the image data 140, the authenticity of the video or image can be verified, providing an additional layer of veracity to the user's identity. In this example, image data 140 does include an image of the pattern, and the system automatically communicates this information to the service representative. Thus, in FIG. 1, without further action or presentation of credentials by first user 102, the communication session can proceed with permitting first user 102 access to the account linked to the authenticated identity of the first user 102. The first user 102 is then able to make account requests and/or receive sensitive account information.

While in some embodiments the system may incorporate additional layers of authentication that may supplement the authentication process, such as facial recognition, voice recognition, fingerprint recognition, password or pin-code verification, or other such factors, it may be appreciated that the system can be readily implemented without such additional steps. In other words, the first user 102 is able to obtain access to the desired secured resources without an identification card, debit card, or other system-provided token typically presented for such occasions. The system thereby allows the user to be passively (i.e., 'touchlessly') authenticated. In some embodiments, the system is further configured to automatically provide the user with access to the secured service linked to the user's unique account, in response to the authentication that is performed based only or primarily on the image data capture of the visual or haptic pattern.

Figure 2:
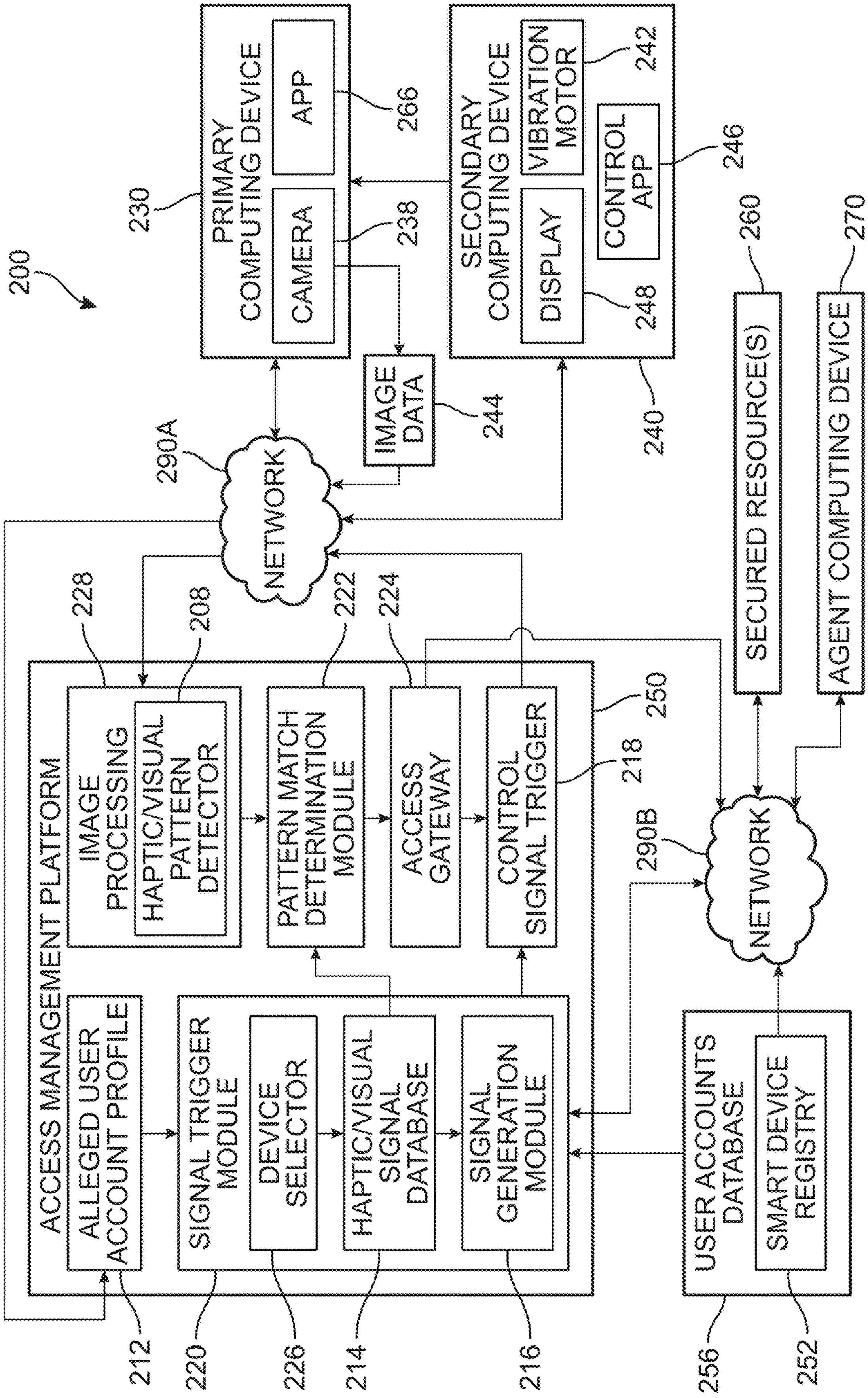
FIG. 2 is an overview of an architecture of a remote signaling-based authentication system, according to an embodiment.

For purposes of clarity, an overview of a system architecture ("architecture") 200 for an embodiment of an access management system is depicted in FIG. 2. It should be understood that the architecture 200 as presented is for purposes of illustration only, and other embodiments may utilize different or additional components or processes. The architecture 200 may alternatively include additional, fewer, or different components. For example, the architecture 200 may include additional storage devices, additional servers, additional computing devices, and other features not shown in FIG. 2.

In FIG. 2, the architecture 200 can be seen to include an access management platform ("platform") 250, a secondary computing device ("secondary device") 240, a primary computing device ("primary device") 230, and an optional agent computing device ("agent device") 270. Devices and components of architecture 200 can communicate with each other and with other components of architecture 200 over one or more networks (shown here as 290A and 290B, and referred to collectively as 290). The networks 290 may comprise any number of electronic devices and use any number of communication protocols to facilitate data communications within the network 290. One having skill in the art would appreciate that the network 290 may include a variety of internal and/or external networks 290 of various types implementing various data communications technologies. The communication over the network may be performed in accordance with various communication protocols such as Transmission Control Protocol and Internet Protocol (TCP/IP), User Datagram Protocol (UDP), and IEEE communication protocols. The networks 290 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network 290 may include a physical and/or logical architecture defined by firewalls, proxy servers, routers, switches, or similar features that implement various levels of security and my function as logical gateways or boundaries.

It can be seen in FIG. 2 that agent device 270, secondary device 240, primary device 230, and platform 250 can be configured to work in conjunction with a telephony/videoconferencing application ("application" or "app") such as a teleconferencing software application. For example, implementations described herein may be performed via any electronic communications between an agent and a customer including, but not limited to, telephone, video telephone, chat (e.g., IM, Slack™, Jabber™), video chat (e.g., Skype™, MS Teams™, Zoom™, Facetime™), internet based meetings (e.g., WebEx™), custom call-center systems, and other conference call systems. In addition, application can be configured to present various interfaces by which administrator or other users can interact with features of platform 250. In this case, primary device 230 includes an app 266 through which a user can conduct communication sessions with a remote agent. In addition, secondary device 240 can include a similar app with an additional feature by which control signals may be executed, represented as a control app 246. In other embodiments, control app 246 of secondary device 240 can be configured as a simple software execution mechanism which receives, translates, and presents output in response to signals transmitted by the platform.

In different embodiments, the platform 250 is capable of communicating with external devices such as agent device 270 (also referred to herein as an administrator computer), the primary device 230 (also referred to herein as the image capture device), and the secondary device 240 (also referred to herein as the controlled or presentation device) through the network 290 using wired or wireless communication capabilities. The platform 250 can be understood to comprise a cloud-based server and, along with the agent device 270, may include computing devices comprising any number of components, such as a Network Interface Card (NIC), allowing the respective devices to receive, transmit, process, and store information obtained from the image capture devices. In other words, the architecture 200 may include groups or subgroups of computing devices that can communicate with each other, but not necessarily with the computing devices in other groups or subgroups. The architecture 200 may include computing devices of disparate types, having different types of hardware and software configurations and in a variety of different locations. In some cases, multiple devices or subsystems can be identified together as a single computing device.

The platform 250, agent device 270, primary device 230, and/or secondary device 240 may include one or more processors, non-transitory machine-readable storage media, and a data communication interface (e.g., NIC card), as well as user interface devices, for example, a monitor, touchscreen, mouse, or keyboard. These components can be implemented as computing devices or mobile devices, such as smart phones, personal digital assistants (PDAs), portable media players, smart watches, smart glasses, smart jewelry, smart apparel, laptops, notebooks, tablets, and others, and can include work stations, mainframes, non-portable computing systems, devices installed in structures, vehicles, and other types of installations.

In different embodiments, the platform 250 includes or is configured to access one or more databases, such as member profile or a user accounts database 256, and a smart device registry 252. The user accounts database 262 is a content library that stores account data related to one or more users. The data may include, for a plurality of users, name, personal and professional details, user facial recognition data, current and past policy for the user, credit limit of users, among other details. The smart device registry 252 stores connection information for known (registered) user devices for which the user has authorized and enabled the input and execution of a control signal. In one embodiment, the registry maintains a listing of one or more smart devices for each end-user subscribed to the control signal-based authentication feature. In different embodiments, the registry 252 therefore includes a protocol providing communication with control app 246 installed on one or more smart devices located in the user's personal space (e.g., residence, workplace, vehicle, etc.) or that are regularly worn by the user an are equipped with or have a connection to a display 248 and/or vibration motor 242. It can be understood that the end-user has also provided consent to the system for remote access of each of these registered devices as appropriate. For example, a user may have a smart virtual assistant device (e.g., Apple® watch, Amazon Echo®, Google Home®, Google Glass®, Fitbit®, Ringly®, etc.) in their possession. The end-user can permit the system (e.g., components of platform 250 and/or agent device 270) access to their smart technology for authentication purposes.

In some embodiments, for example in cases where the user does not own wearable technology, a user may opt to register multiple smart devices with his or her account. For example, the user may have one smart device saved in the registry 252 for when he/she is in the basement of their home, another for when he/she is on the main floor, and another at their mother's house where they are frequently visiting, etc. The user can identify the location in which the device is stationed, and the system can tag the device listing accordingly.

In addition, in different embodiments, the user may opt to provide smart device updates at different intervals. For example, the user may move residences or change jobs, purchase and/or replace smart devices, or experience some other change that may affect the validity of the device access as previously stored, and therefore he/she may request to submit new device data. In other cases, the merchant or other authentication entity may require or recommend that participants provide updated device information twice a year, once a month, or at other less or more frequent intervals to ensure the smart device(s) that are stored is up-to-date. In one embodiment, the smart device listing and associated consent can be linked to an expiration date or period of time after which the participant will be required to provide new (current) device data. In some embodiments, an account for the customer verifying their identification credentials can also be linked to the customer's smart device at or around that time. Thus, a verification process may occur in conjunction with the collection of the initial smart device listing for that user, whereby the participant presents identity documents that can be used to confirm the user's identity. The user identity can then be linked to the identified smart device in the record. These devices can be accessed by platform 250 to generate verification output, as will be discussed below.

Furthermore, in different embodiments, the platform 250 includes or has access to a haptic and/or visual signal database ("signal database") 214. In some embodiments, the signal database 258 may store image and/or vibration patterns and executable files associated with one or more computer vision applications (e.g., OpenCV). A computing device may execute a computer vision application that may identify the objects captured in the image content.

In some embodiments, primary device 230 and/or secondary device 240 include a GPS receiver that can receive GPS information or other receivers capable of receiving global or local positioning information. In other embodiments the user may communicate their location directly (e.g., via message or voice). This user location information can be submitted to the platform 250 and received by signal trigger module 220. The signal trigger module 220 is configured to evaluate the user location information and determine whether there are on-site smart devices registered for the user via access to registry 252 that can serve as target devices. In other examples, the registry 252 may include a wearable device that serves as the purported user's secondary device. In such cases, the signal trigger module 220 will immediately identify the target device. In another embodiment, the registry 252 can include a priority ordering of one or more wearable and/or other smart devices as designated by the user that can be signaled one by one until an image of the device near or on the user responding to the signal is captured.

Once the signal trigger module 220 identifies a device associated with the purported user, it may select (i.e., at random or following a particular order) a signal for authentication by reference to the signal database 214. The signal database 214 includes one or more visual and/or haptic signals that may be used for verification purposes. These signals may be a few milliseconds to a few seconds in duration. In some embodiments, the signals are configured to cause to be presented a visual pattern on display 248, while in other embodiments, the signals are configured to cause vibration motor 246 to be activated and produce a particular vibratory pattern.

In different embodiments, the system can include provisions to ensure or otherwise facilitate the capture of output generated from secondary device 240 by camera 238 of primary device 230. In one embodiment, the agent, via agent computing device 270, can request (via message or voice) that the user move the secondary device into the field of view of the camera 238. It can be appreciated that in some embodiments, the user's face will have been detected during the communication session and can serve as a preliminary authentication credential. This may happen before or during the remote-signaling based authentication procedure. In other words, the person's face can be captured and compared with reference face data stored in the user's profile to determine if there is a match. However, while such a process is helpful, it is increasingly insecure or unreliable due to the proliferation of deep fake technologies and other image-based forgeries. In order to address this threat, the platform is configured to send a signal to the user's known (pre-registered) secondary device and capture the output of the secondary device, thereby proving the video is authentic.

In different embodiments, the platform can be configured to automatically detect the presence of the secondary device 240 during a video session with the user, and generate guidance to the user via app 266 to move the secondary device 240 into a position that optimizes the image capture of the secondary device response to the control signal. For example, as a user moves their wrist into the field of view of the camera, the app 266 can determine that the display 248 is tilted so as to obstruct a portion of the display 248, and request that the user turn their wrist in a particular direction to better 'see' the display 248. In another example, the secondary device 240 may be out of range of a field of view of camera 238, and the system can automatically present a request to the user to move the designated secondary device 240 into the camera's field of view. In one embodiment, the system will show the user, on a display for the primary device 230, the image data being recorded so that the user can move to accommodate the view of the camera.

Once the signal has been obtained, a signal generation module 216 is configured to issue an output request ("control signal trigger") 218 that includes information enabling the system to connect to the secondary device 240, as well as provide the selected haptic and/or visual signal to the device over network 290. Thus, when a user requests access to a secured resource, for example via a user interface presented on primary device 230 over network 290, the control signal trigger 218 may be generated by platform 250, causing a display (in cases of a visual pattern) and/or production (in cases of a haptic pattern) of the signal. In some embodiments, primary device 230 is configured to send image content (image data 244) captured by camera 238 to remote components such as the platform 250 and/or the agent device 282. In one embodiment, the transmission of the control signal to the secondary device 240 occurs at the same time or otherwise close in time as a transmission of a camera control signal from the platform 250 to the primary device 230. The camera control signal is configured to cause the camera 238 to record images during a period of time overlapping with the scheduled output of the secondary device 240. This ensures that the image data 244 is collected when the visual/haptic pattern produced by the secondary device 240 occurs.

In different embodiments, image signal processing algorithms and/or software (e.g., image processing module 228) may reside in primary device 230, platform 250, agent device 270, and/or other devices of architecture 200 for pre-processing and processing of the captured image data 244. For example, the image input can be cleansed and normalized by the image processing module 228. In different embodiments, various image processing algorithms and/or software may be used with captured image data. In one embodiment, the image processing algorithms perform compression, artifact correction, noise reduction, color corrections, geometric corrections, imager non-uniformity correction, etc., and various image processing enhancement operations on the image content. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms.

In some embodiments, image processing may also include machine learning techniques that can be used to discriminate between features and to identify objects, for example via image recognition and object detection software. Such techniques may also include machine vision algorithms that perform, among other operations, symbol and logo recognition, general shape recognition, as well as object classification. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. For example, texture detectors and edge detectors known to those skilled in the art may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™. Some non-limiting examples of object detection algorithms include R-CNN, SPP, Fast R-CNN, Faster R-CNN, Feature Pyramid networks, RetinaNet (Focal loss), Yolo Framework—Yolo1, Yolo2, Yolo3, and SSD.

In some embodiments, machine learning techniques, such as deep learning that includes classification, clustering, and/or other techniques, are trained to detect the specific patterns that may be presented or produced to represent the visual or haptic signal received, and are then captured in the image data. Such ML techniques may include, but are not limited to, techniques that employ deep learning neural networks for pattern recognition within the image data, or to perform other types of analysis. For example, a neural network and/or classification technique may be used to train a model that is a classifier and that is useable to detect different pattern types. Some suitable artificial intelligence software is available for public access through open-source AI platforms like Caffe, Torch and Theano who provide businesses access to powerful neural networks for processing of their information by AI techniques like deep learning, reinforcement learning and logistic regression, as well as TensorFlow, OpenAI, and BigSur.

In one embodiment, the image signal processing module 228 can classify objects in the image data to determine which image segment represents the secondary device. Once the secondary device is identified, the operation of the secondary device during the period of time in which the control signal is implemented by the secondary device is evaluated. In one embodiment, the platform 250 is configured to compare the image segment corresponding to secondary device in the image data 244 against the reference pattern (i.e., the pattern that should be presented via a display or vibration when the selected signal is executed) via a haptic-visual pattern detector 208. If the patterns match within certain parameters, the user is deemed to pass the authentication or verification test, indicating with a high likelihood that the user is indeed the account holder or other authorized person.

In some embodiments, the image data 244 is processed and models or representations of the image are built. These models are compared against one another. In different embodiments, one or both samples may be deemed unacceptable or unusable if the image is too bright or too dark, or if there is too much noise (poor signal to noise ratio). If a sample is not acceptable the system may request an additional or further sample and again trigger generation of visual and/or haptic indicators from the smart device (either the same signal or a different/new signal).

If the image data is acceptable or sufficient, a scoring occurs via a pattern match determination module 222. The scoring process is analogous to "what is the probability that the pattern captured by the primary device are the same as the verification reference sample that is stored in the signal database 214 for each signal?" Thus, in some embodiments, the determination of a "match" is not necessarily based on the verification/reference sample directly or exactly matching the content of the image sample, but rather on the two samples being substantially similar or sharing particular features. The returned score is evaluated against a threshold value to determine if it meets or exceeds the minimum acceptable score by access gateway 224. If the score is determined to be successful, the platform 250 and/or agent may allow a user to proceed further within a call center or telephone banking menu system or other secured resource 260 being safeguarded by the service provider. In other embodiments, pattern match determination module 222 can be configured such that the pattern detected (if any) from the captured images must directly correspond to the pattern in signal database 214 in order for a match identification to occur.

Thus, the data samples are compared by the pattern match determination module 222, and if a match is found or is in an acceptable range, the access to secured resource(s) 260 by the user will be allowed and/or enabled by access gateway 224. Otherwise, access is denied, or blocked pending further verification. In some embodiments, the system is configured to then automatically generate a message indicating an unauthorized attempt to access the secured resource may have occurred. In some embodiments, this message can be automatically transmitted by the platform to the second computing device or account address for the registered user.

It can be appreciated that authentication based on verification of the user's possession of secondary device 240 strongly implies that the user's identity is true and correspondingly is in fact entitled to whatever access is being requested. It should be understood that while the platform 250 bases access decisions at least in part on the detection of the designated vibratory and/or visual pattern, in some embodiments, the system is further configured to first confirm that the user ID and optional password match based on information available in the user accounts database 256.

Although not shown in FIG. 2, it should be understood that a support agent (human or virtual) can be connected to and interact with customers via a call management or customer support server that can manage the distribution, transfer, and handling of various calls that come into the support center. For example, a customer may be routed via the customer support server to an appropriate agent computing device associated with a particular member service representative (MSR) better suited to respond to the particular caller. In different embodiments, the agent device 270 can be connected to or include an internet customer interface for providing support specifically to customers or members who contact them via the Internet. As a general matter, support agents or service representatives can refer to any person or personnel who offers the caller (or person who was called) assistance, and has access to the platform 250 during the communication session with the customer.

Figure 3:
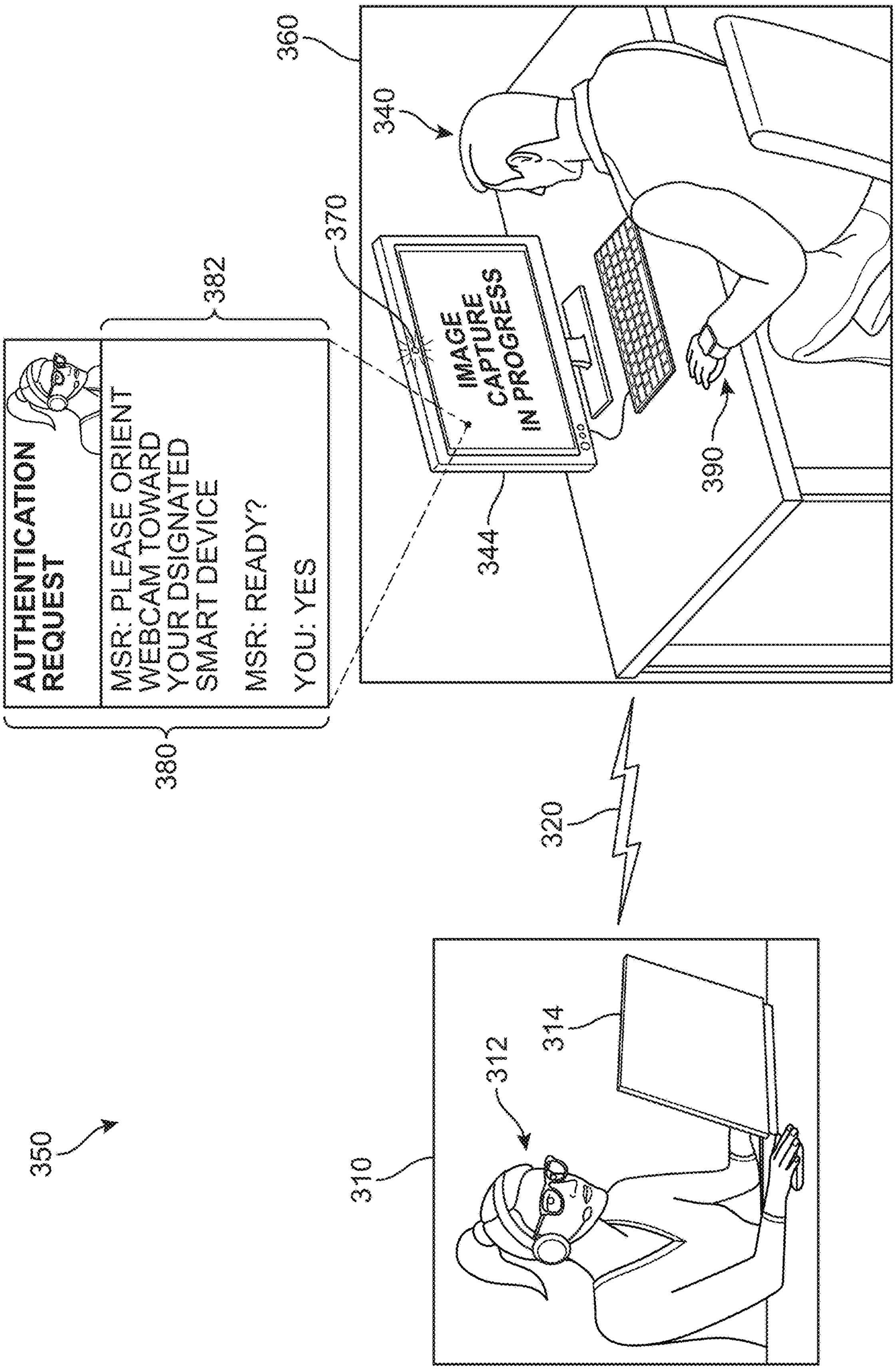
FIG. 3 depicts an example of a user requesting access to a secured resource and the authentication system initiating a remote signaling event, according to an embodiment.

Referring now to FIGS. 3-6, an example of an authentication scenario occurring during a communication session 350 between a second user 340 and an agent 312 is depicted. In FIG. 3, the second user 340 is, via a first computing device ("first device") 344 at a remote location 360, interacting with the access management platform and communicating with an agent 312 via network 320. The second user 340 also wears a smartwatch on his wrist which serves as a second computing device ("second device") 390. The agent 312 is communicating with second user 340 via a third computing device ("third device") 314 located at a remote site 310 such as a call center or other business.

For purposes of this example, the second user 340 has requested access to secured resources associated with a user account managed by the entity which agent 312 is representing. In this case, a first user interface ("first interface") 380 provides a first chat window 382 to allow the second user 340 to partake in an instant messaging session with the second agent 312 ("Authentication Request-MSR: Please orient webcam toward your designated smart device/MSR: Ready?/YOU: Yes"). In other embodiments, the communication can occur in part or fully via a video conferencing interface whereby the agent 312 and second user 340 speak in real-time over a video screen. Once the second user 340 provides his consent, an image capturing event is automatically triggered by the system or initiated by the agent 312, and image data collected by an image sensor ("camera") 370. In some embodiments, the image capture event is scheduled to occur at a first time. Prior to or substantially synchronous to the transmission of the control signal causing the image capturing event at the first device 344, a different control signal is transmitted to the second device 390 instructing second device 390 to display a particular pattern on its screen and/or produce a particular pattern via its vibration motor, at a second time that coincides with the first time.

Thus, in different embodiments, it can be understood that a user can communicate via an interface generated by an application provided by access management system. The application can offer a user interface that may be accessed via any user computing device configured for connection to a network. In different embodiments, the application can be configured to offer content via native controls presented via an interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video or other media associated with a user interface, or other such information presentation.

Figure 4:
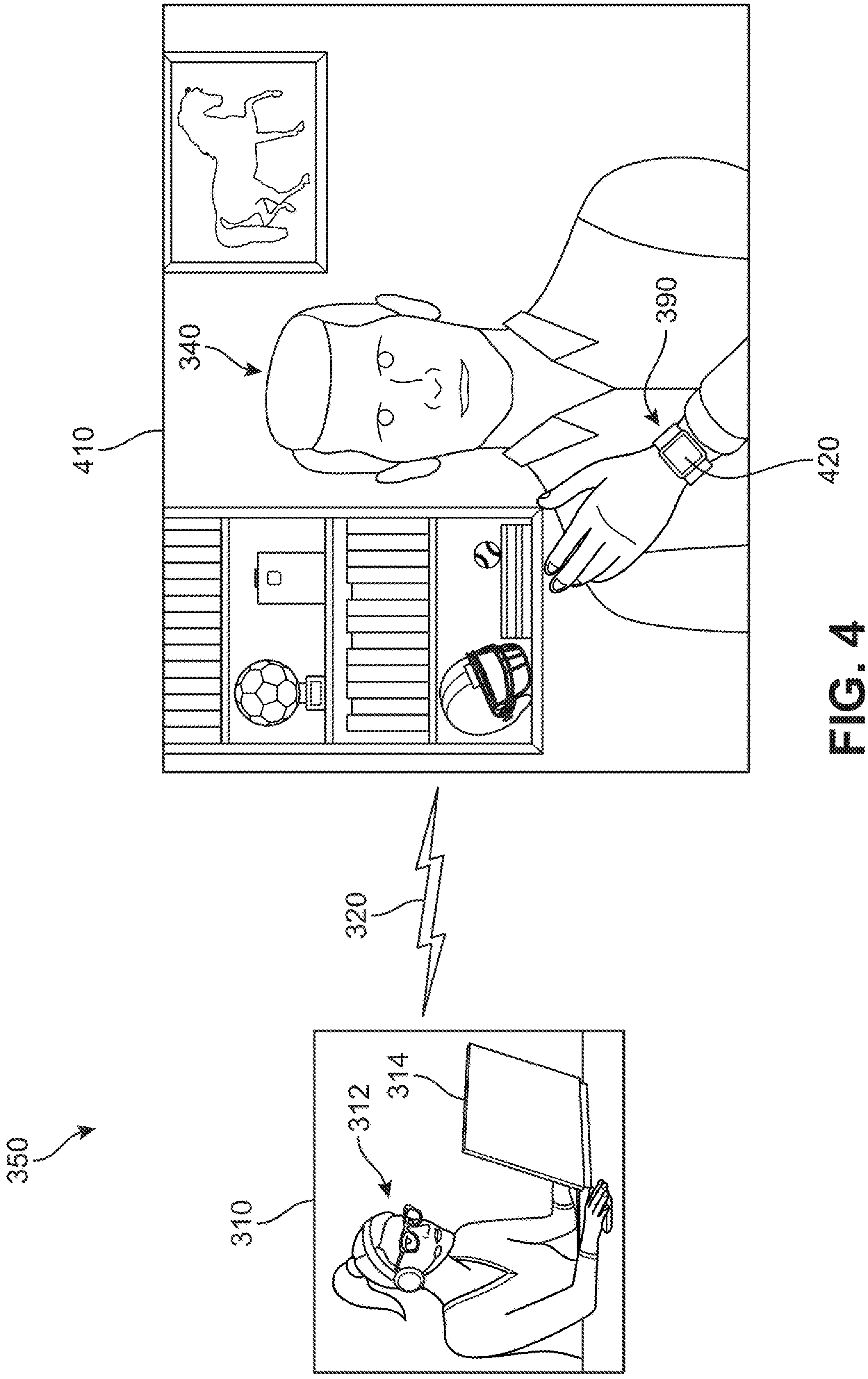
FIGS. 4, 5A, and 5B depict an example of a sequence of image data as obtained by the authentication system before and during the remote signaling event, according to an embodiment.

In FIG. 4, a depiction of first image data 410 as received by the platform and/or agent 312 at the third device 314 via network 320 is shown. The second user 340 has positioned himself in front of a camera for the first device (see FIG. 3). In addition, per the authentication request, the second user 340 moves in order to adjust the pose of his smartwatch (second device 390) to be in the field of view of the camera. In cases where the control signal to second device 390 includes a visual signal, the agent and/or system can request that a screen 420 for the smartwatch faces toward the camera, as shown in FIG. 4. This allows any information that is presented on screen 420 to be in the field of view of the camera. For purposes of this disclosure, a pose refers to an object's estimated position and orientation in three dimensions, where position may be specified by linear measurements with respect to orthogonal 3D axes such as X, Y, and Z, and orientation may be specified by angular measurements around the 3D axes, such as by the angles $\theta_x$, $\theta_y$, and $\theta_z$, corresponding to angular measurements with respect to the X, Y, and Z axes, respectively. A pose may be indicated or specified by the vector $[X, Y, Z, \theta_x, \theta_y, \theta_z]$.

Figure 5A:
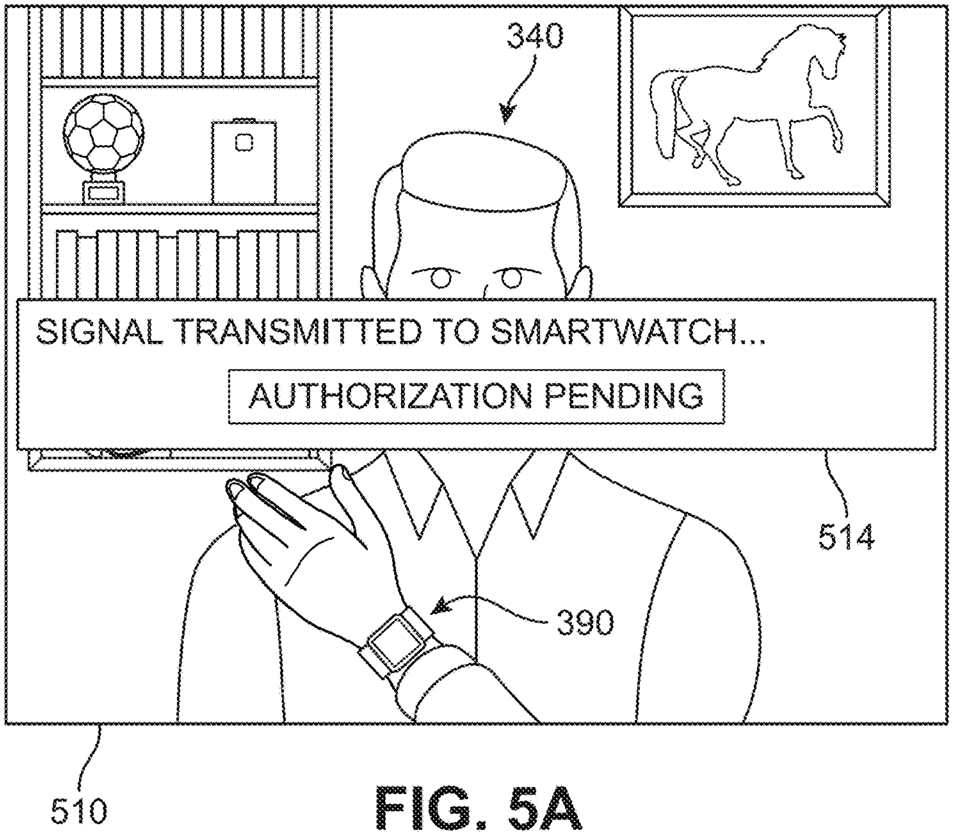
Figure 5B:
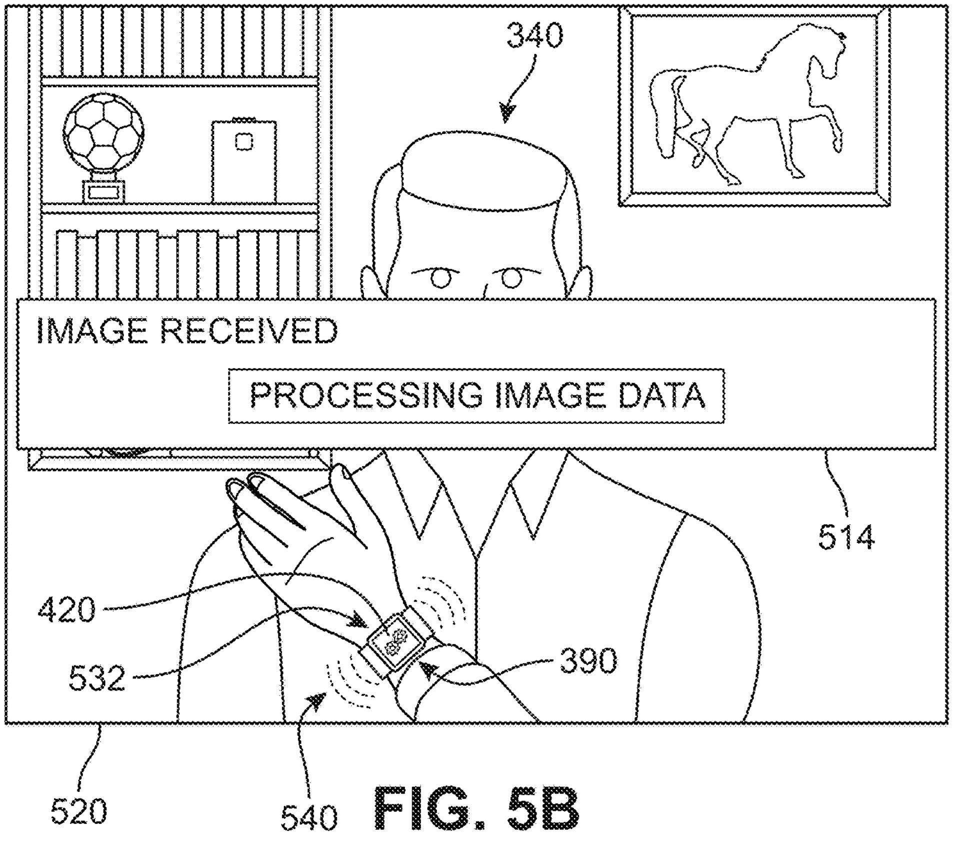

In embodiments in which the control signal to second device 390 includes a haptic signal, a particular pose of the screen 420 of second device 390 may not be required, unless the visual signal is also included (i.e., the authentication is based on detection of both a vibration pattern and a visual pattern). Referring to FIG. 5A, a depiction of second image data 510 (captured subsequent to the capture of the first image data 410 of FIG. 4) as received by the platform is shown. The control signal has been transmitted to the second device 390, as indicated by a first status message 512 ("Signal transmitted to smartwatch. Authorization pending"). In FIG. 5B, a depiction of third image data 520 (captured subsequent to the capture of the second image data 510 of FIG. 5A) as received by the platform is shown. For purposes of this example, the control signal includes both types of authentication signals. However, in other embodiments, only one of the signal types (visual or haptic) may be transmitted, and the authentication dependent on only the detection of that particular signal.

Thus, the control signal has been received by the second device 390 causing the second device 390 to present a first visual pattern 532 on screen 420. In addition, at or around the same time, a vibration motor (not shown) of the second device 390 produces a first vibration pattern 540 caused by the control signal. The behavior of the second device 390 during these operations is captured as third image data 520, which may comprise a video sample or other sequence of streaming images. The system initiates processing of the image data, as indicated by a second status message 514.

Figure 6:
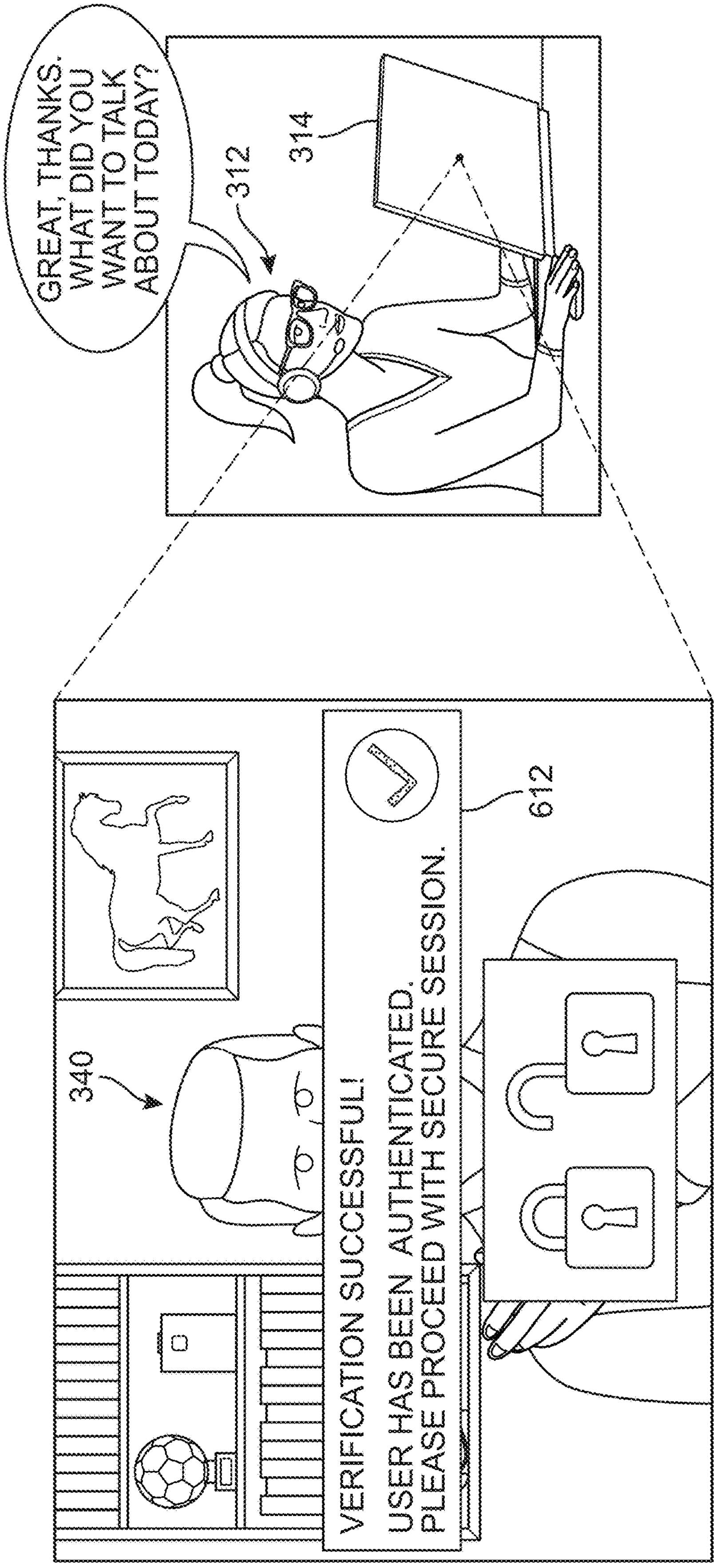
FIG. 6 depicts an example of a system determination that the image data includes the correct pattern and granting access to the secured resource, according to an embodiment.

In different embodiments, the image classifier and pattern detector (see FIG. 2) can receive the image data and automatically detect the presence of the second device 390. In some embodiments, the configuration of the second device 390 (e.g., the size, shape, type, model, etc.) is known to the platform, obtained during registration of the second device 390 in the user profile. The pattern detector determines whether the second device has presented and/or produced the correct pattern per the reference pattern(s) for the selected signal. In FIG. 6, the patterns have been determined to be similar enough so as to be classified as a match, as indicated by a third status message 612 ("Verification successful! User has been authenticated. Please proceed with secure session") presented to the agent. The system can then automatically enable or grant the second user 340 to access the secured resource, or the agent can respond to the verification by manually enabling access.

Figure 7:
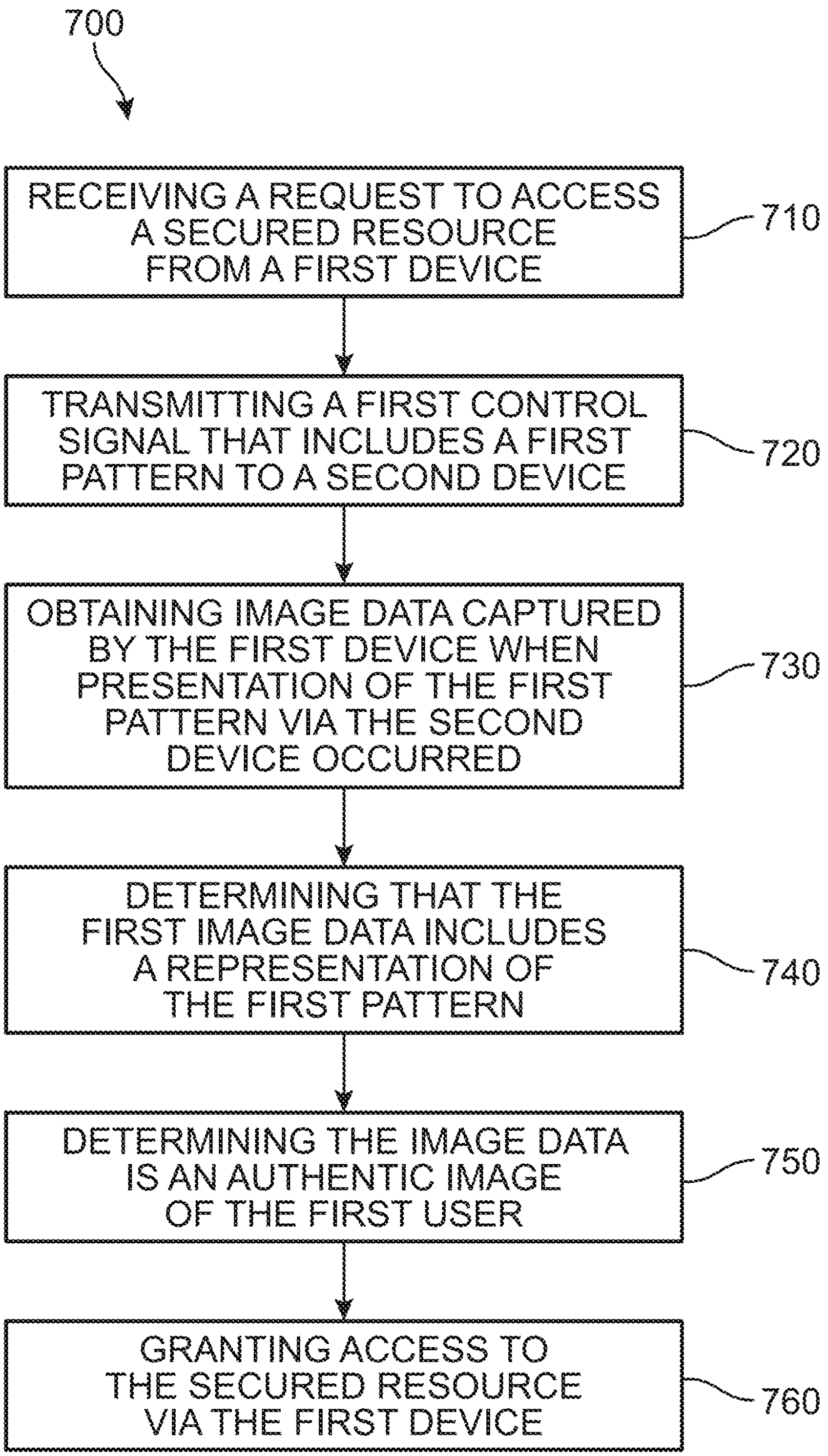
FIG. 7 is a flow chart depicting a process of verifying an authenticity of images in order to protect user resources, according to an embodiment.

FIG. 7 is a flow chart illustrating an embodiment of a method 700 of verifying an authenticity of images in order to protect user resources. The method 700 includes a first step 710 of receiving, at a cloud-based authentication system and from a first computing device, a request to access a secured resource of a first user. The method 700 also includes a second step 720 of transmitting, from the authentication system and in response to the request, a first control signal to a second computing device associated with the first user, the first control signal including a first pattern. A third step 730 includes obtaining, at the authentication system, first image data captured by the first computing device when presentation or production of the first pattern via the second computing device was to have occurred, the first image data also including a face of a person. Furthermore, a fourth step 740 includes determining that the first image data includes a representation of the first pattern. A fifth step 750 includes determining, in response to the first image data including a representation of the first pattern, that the first image data is an authentic image of the first user, and in a sixth step 760, granting access to the secured resource via the first computing device.

In other embodiments, the method may include additional steps or aspects. In some embodiments, the method also includes a step of transmitting, from the authentication system and to the first computing device, a second control signal including instructions to capture image data at a first time, thereby causing the first computing device to capture image data via a camera associated with the first computing device. In another example, the first control signal includes a visual signal configured to cause the representation of the first pattern to be rendered on a screen of the second computing device. In some embodiments, the first control signal includes a haptic signal configured to cause the representation of the first pattern to be produced by activity of a vibration motor of the second computing device.

In another embodiment the method further includes steps of receiving access information for the second computing device at a second time earlier than the first time, storing the access information in a first record linked to the first user identity, and using the access information to request that the second computing device perform an operation in response to the first control signal. In one embodiment, the secured resource includes one of a service, feature, and information for which access is restricted to one or more authorized persons. In some examples, the first image data is obtained during a telephone or videoconferencing session between the first user and a service representative associated with the secured resource. In another example, the second computing device is a wearable smart device.

Other methods may be contemplated within the scope of the present disclosure. For example, in some embodiments, a method of detecting fraudulent attempts to obtain access to secure user data using image data is disclosed. The method includes a first step of receiving, at a cloud-based authentication system and from a first computing device, a request to access a secured resource of a first user, a second step of transmitting, from the authentication system and in response to the request, a first control signal to a second computing device associated with the first user, the first control signal including a first pattern, a third step of obtaining, at the authentication system, first image data captured by the first computing device when presentation or production of the first pattern via the second computing device was to have occurred, the first image data also including a face of a person, a fourth step of determining that the first image data fails to include a representation of the first pattern, a fifth step of determining, at the authentication system and in response to the first image data failing to include a representation of the first pattern, that there is a high likelihood of the request originating from a fraudulent source, and a sixth step of denying the request and blocking access to the secured resource (in response to the determination that there is a high likelihood of the request originating from a fraudulent source).

In such embodiments, the method may include additional steps or aspects. In some embodiments, the method also includes a step of transmitting, from the authentication system and to the first computing device, a second control signal including instructions to capture image data at a first time, thereby causing the first computing device to capture image data via a camera associated with the first computing device. In some embodiments, the method also includes steps of receiving access information for the second computing device at a second time earlier than the first time, storing the access information in a first record linked to the first user identity and using the access information to request that the second computing device perform an operation in response to the first control signal.

In some embodiments, the secured resource includes one of a service, feature, and information for which access is restricted to one or more authorized persons. In another example, the first image data is obtained during a telephone or videoconferencing session between a user of the first computing device and a service representative associated with the secured resource. In one embodiment, the first image data is at least partially generated using deep fake technology. In some embodiments, the method can also include steps of generating a message indicating an unauthorized attempt to access the secured resource may have occurred, and automatically transmitting the message to the second computing device.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A computer-implemented method of verifying an authenticity of images in order to protect user resources, the method comprising:

receiving, at a cloud-based authentication system and from a first computing device including a camera, a request to access a secured resource of a first user;

accessing a smart device registry associated with the first user, by the authentication system, to determine at least one second computing device of the first user for which the first user has authorized and enabled execution of a control signal;

in response to the request, transmitting, from the authentication system, a first control signal to the determined second computing device associated with the first user, wherein the second computing device is different than the first computing device, the first control signal including a first pattern;

transmitting, from the authentication system, a second control signal to the first computing device, the second control signal triggering first image data captured by the camera of the first computing device;

obtaining, at the authentication system, the first image data captured by the camera of the first computing device when presentation or production of the first pattern via the second computing device was to have occurred, the first image data including the second computing device;

determining that the first image data includes a representation of the first pattern by the second computing device; and determining, in response to the first image data including a representation of the first pattern, that the first user is permitted access to the secured resource of the first user via the first computing device.

2. The method of claim 1, wherein the smart device registry includes a protocol providing communication with a control app installed on one or more smart devices located in the first user's personal space or that are regularly worn by the first user and are equipped with or have a connection to a display and/or a vibration motor.

3. The method of claim 1, wherein the smart device registry associated with the first user includes multiple smart devices associated with an account of the first user.

4. The method of claim 3, wherein the multiple smart devices are associated with different locations.

5. The method of claim 4, wherein at least one smart device is located at a location that is different from a location of at least one other smart device.

6. The method of claim 1, wherein the smart device registry associated with the first user is updated at a periodical interval.

7. The method of claim 1, wherein the smart device registry associated with the first user is updated upon at least one of the first user changing a residence, changing a job, or replacing a smart device.

8. The method of claim 1, further comprising:

receiving user location information from at least one of the first computing device or the second computing device;

evaluating the received user location information to determine whether any smart devices registered by the first user in the smart device registry are located at the user location; and identifying at least one smart device located at the user location as the second computing device.

9. The method of claim 8, wherein the smart device registry includes a priority ordering of one or more smart devices designed by the first user.

10. The method of claim 1, further comprising:

accessing, by the authentication system, a signal database to select the first pattern, wherein the signal database includes a plurality of image and/or vibration patterns.

11. A system for verifying an authenticity of images in order to protect user resources, the system comprising a processor and machine-readable media including instructions which, when executed by the processor, cause the processor to:

receive, at a cloud-based authentication system and from a first computing device including a camera, a request to access a secured resource of a first user;

access a smart device registry associated with the first user, by the authentication system, to determine at least one second computing device of the first user for which the first user has authorized and enabled execution of a control signal;

in response to the request, transmit, from the authentication system, a first control signal to the determined second computing device associated with the first user, wherein the second computing device is different than the first computing device, the first control signal including a first pattern;

transmit, from the authentication system, a second control signal to the first computing device, the second control signal triggering first image data captured by the camera of the first computing device;

obtain, at the authentication system, the first image data captured by the camera of the first computing device when presentation or production of the first pattern via the second computing device was to have occurred, the first image data including the second computing device;

determine that the first image data includes a representation of the first pattern by the second computing device; and determine, in response to the first image data including a representation of the first pattern, that the first user is permitted access to the secured resource of the first user via the first computing device.

12. The system of claim 11, wherein the smart device registry includes a protocol providing communication with a control app installed on one or more smart devices located in the first user's personal space or that are regularly worn by the first user and are equipped with or have a connection to a display and/or a vibration motor.

13. The system of claim 11, wherein the smart device registry associated with the first user includes multiple smart devices associated with an account of the first user.

14. The system of claim 13, wherein the multiple smart devices are associated with different locations.

15. The system of claim 14, wherein at least one smart device is located at a location that is different from a location of at least one other smart device.

16. The system of claim 11, wherein the smart device registry associated with the first user is updated at a periodical interval.

17. The system of claim 11, wherein the smart device registry associated with the first user is updated upon at least one of the first user changing a residence, changing a job, or replacing a smart device.

18. The system of claim 11, wherein the instructions further cause the processor to:

receive user location information from at least one of the first computing device or the second computing device;

evaluate the received user location information to determine whether any smart devices registered by the first user in the smart device registry are located at the user location; and identify at least one smart device located at the user location as the second computing device.

19. The system of claim 18, wherein the smart device registry includes a priority ordering of one or more smart devices designed by the first user.

20. The system of claim 11, wherein the instructions further cause the processor to:

access, by the authentication system, a signal database to select the first pattern, wherein the signal database includes a plurality of image and/or vibration patterns.

* * * * *